April 28, 1959     F. L. DONNELL     2,884,274
TAPERED SOCKET AND PLUG THEREFOR
Filed Dec. 31, 1954
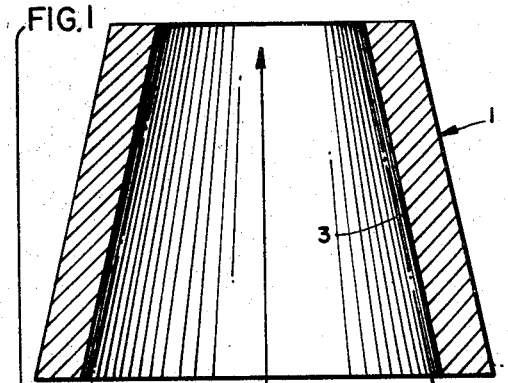
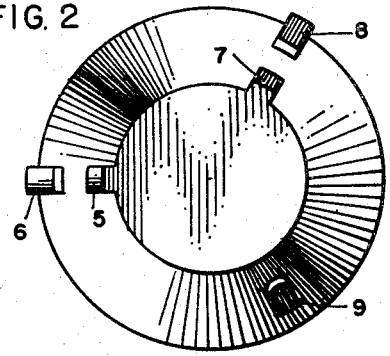
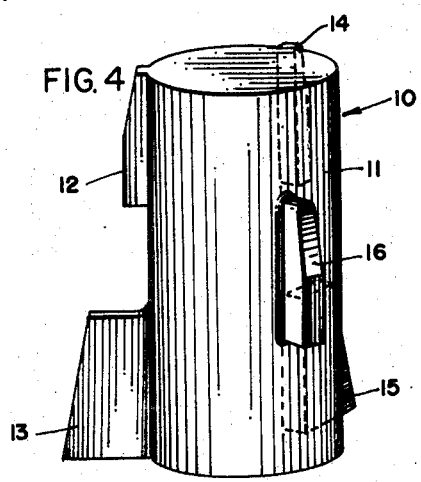
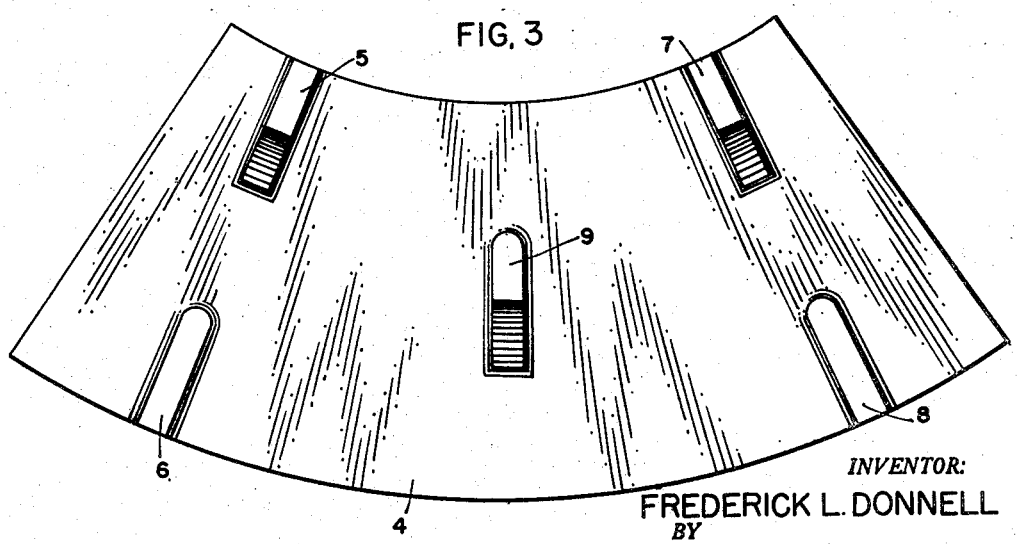
INVENTOR:
FREDERICK L. DONNELL
BY
Marzall, Johnston, Cook & Root
ATT'YS United States Patent Office
2,884,274
Patented Apr. 28, 1959

2,884,274

TAPERED SOCKET AND PLUG THEREFOR

Frederick L. Donnell, St. Joseph, Mich., assignor to Saranac Machine Company, Benton Harbor, Mich., a corporation of Michigan Application December 31, 1954, Serial No. 478,989

2 Claims. (Cl. 287—126)

This invention relates in general to a novel form of a tapered socket and plug therefor and is directed more particularly to a construction of socket and plug which can be formed without the necessity of a machining operation.

Tapered socket and plug devices have been used heretofore in a number of various applications. In some instances it may be desirable to have the plug wedged within the socket, such as in the machine tool art where it is necessary to exert force in removing the plug. In other instances it may be desirable to have the plug fit snugly within the socket but easily removed therefrom. One specific application embodying this latter form of the device is on small boats. The socket is fixed to the bow of the boat and the anchor is fixed to the plug. When the anchor is raised by means of a cable attached thereto, the plug will fit snugly within the socket without any relative movement between the two members. It may also have applications in the farm equipment industry.

The invention, however, resides in the construction of the members making up the assembly rather than in any particular application of the device.

Heretofore it has been necessary to machine the inner surface of the socket and the outer surface of the plug to insure a snug fit between the two members. Whether or not a wedging action will take place depends upon the angle of the tapered walls with respect to the axis thereof. The smaller the angle the greater will be the wedging action. In the present construction there is no intention to limit the taper to any particular angle since the invention resides in a construction which will permit a snug fit between the plug and socket without the necessity of any machining operation. The parts of the device may be cast, stamped or formed in any other suitable way, but the elimination of the machining operation is a factor in the reduction of cost.

In view of the foregoing it is a particular object of the present invention to provide a tapered socket and plug therefor so constructed that the socket will receive the plug with a snug fit without the necessity of a machining operation.

Another object of the invention is to provide a tapered socket and plug construction wherein one of the members has a plurality of projections thereon arranged in such a way that contact between said projections and the other member of the assembly will eliminate any relative movement between the two members.

A further object of the invention is to provide a tapered socket and plug construction wherein one of the members of the assembly is provided with at least five projections thereon arranged in a predetermined manner whereby assembly of the plug within the socket will result in a snug fit with no relative movement permitted between the two members.

Still another and more specific object of the invention is to provide a socket member having tapered inner walls and a plug member having projections extending outwardly therefrom and so arranged that a sufficient number of the projections will contact the tapered walls of the socket and prevent relative movement between the plug and socket.

Other objects and advantages of the invention will become apparent upon reading the following description taken in conjunction with the accompanying drawing, in which Fig. 1 is an exploded view of the socket and plug assembly illustrating the socket in vertical section and the plug in elevation and showing the application of the plug to the socket in dot-dash lines;

Fig. 2 is a top plan view of the tapered plug taken along the plane of line 2—2 of Fig. 1;

Fig. 3 is a projection of the plug illustrating more clearly the arrangement of the projections thereon, and Fig. 4 is a perspective view of a modified form of plug.

The tapered socket and plug of the present invention contemplates an arrangement whereby there will be a snug fit of the plug within the socket eliminating any relative movement between the two members without the necessity of machining either member. It has been determined that this can be accomplished by properly locating a plurality of projections on one or the other of the members. The contacting surfaces of the projections preferably have the same or substantially the same taper as the taper of the surface which the projections are to contact when the two members are assembled. For example, if the plug is frusto-conical with a smooth surface and it is to be inserted into a socket having tapered walls, then the projections may be positioned on the walls of the socket, but the surfaces of the projections or a line connecting axially spaced projections should have substantially the same taper as that of the surface of the plug. This, however, is not necessary for the proper functioning of the device, but is desirable to increase the life of the contacting surfaces. The projections could be mere bumps presenting a curved surface of contact.

The converse is also true, namely, if the inner wall of the socket is relatively smooth and the projections are on the outer surface of the plug, then the surfaces of the projections or a line extending between axially spaced projections preferably have substantially the same taper as the walls of the socket which they are to contact when assembled. Again, however, these projections could be mere bumps presenting a curved contacting surface.

In the embodiment of the invention illustrated in the drawing, the projections are located on the outer surface of the plug but it will be understood that the invention also encompasses a reversal of the parts where the projections are on the inner surface of the socket.

Referring now more particularly to the drawing and especially to Fig. 1, the tapered socket is indicated generally by the numeral 1 and the plug by the numeral 2. The configuration of the outer surface of the socket 1 is unimportant since it is the inner surface which provides the socket portion which cooperates with the plug. In Fig. 1 the inner surface 3 of the socket 1 is illustrated as being tapered or positioned at an angle with respect to the axis thereof. The outer surface 4 of the plug 2 also is tapered although the angularity with respect to the axis of the plug is not important where the projections are on the plug rather than on the inner surface of the socket.

It has been determined by numerous experiments that it is necessary to have at least five points of contact between the socket and plug members in order to provide a snug fit and to prevent any sidewise movement of one member with respect to the other. It has also been determined that the location of these points of contact are critical within certain limits.

Figs. 1, 2 and 3 illustrate a preferred arrangement of projections on the plug which has proven satisfactory in actual practice. In the figures there is provided on the plug 2 a projection 5 adjacent one end thereof and a projection 6 adjacent the opposite end thereof. At substantially 120° from the projections 5 and 6 there are located the upper and lower spaced projections 7 and 8. The fifth projection 9 is then positioned at substantially 120° from the projections 7 and 8 and is further positioned at a point intermediate the ends of the plug 2.

The surface area of each projection is relatively unimportant as long as each presents a sufficient area to provide a definite contact with the inner surface 3 of the socket.

It has been established that fewer than five projections would be unsatisfactory since a sidewise movement of the plug with respect to the socket could result, thereupon preventing a snug fit and defeating the purpose of the invention. By way of explanation, it is clear that only two projections, regardless of where they might be located, would not provide sufficient surface contact between the two members to prevent rattling and relative movement between the members. Three projections are likewise unsatisfactory because if they were to be placed at either end of the plug, then the other end could wabble. If they were to be placed intermediate the ends of the plug, then both ends could have a sidewise movement.

The use of four projections has also proved unsatisfactory, regardless of where they are placed, since the snug fit is not achieved with that number.

The use of five projections properly placed will achieve the snug fit without the necessity of any machining operations. In the present instance the projections 5 and 6 are in substantial alignment axially of the plug although it will be appreciated that either of these projections can be offset circumferentially from the other a slight amount and still obtain the desired snug fit.

The same is true with respect to the projections 7 and 8. They are shown in substantial axial alignment but can be offset from each other a slight amount without defeating the purpose of the invention.

The fifth projection 9 is shown intermediate the ends of the plug and in a plane intermediate the upper projections 5 and 7 and the lower projections 6 and 8. Here again it will be clear that a slight variation of this location toward one end or the other of the plug can be permitted and still obtain the desired snug fit.

This preferred form of the invention also provides for a 120° spacing around the surface of the plug for the various projections, but again it will be appreciated that this angular spacing can be varied somewhat and still accomplish the objects of the invention.

More than five projections can be applied if desired but the practical result would be either that no additional advantages would be gained or that only five of the projections would be in contact with the surface of the other member and so more than five would serve no useful purpose.

According to the invention, therefore, both the socket and plug can be cast, stamped or formed in any other desirable way and if five projections are provided on one or the other of the members in the manner above described, no machining operation is necessary to insure a snug fit between the members without relative movement. If desired, for a particular application of the invention, the projecting points of contact could be machined. The advantage of economy in manufacture is still present since only the projections and not the entire member need be machined. As stated above, the projections could be on the inner surface of the socket rather than the outer surface of the plug, if desired, and the same result would be accomplished.

To illustrate the point that the configuration of the plug between the projections has no significance, Fig. 4 shows a plug having a cylindrical surface 11. An upper projection 12 is positioned adjacent one end of the plug and a lower projection 13 is spaced axially therefrom and is located adjacent the opposite end of the plug. A projection 14 similar to the projection 12 is located 120° therefrom adjacent the same end of the plug while a lower projection 15 is spaced axially from the projection 14 and is similar to the projection 13 and spaced 120° therefrom. A projection 16 is disposed intermediate the other pairs of projections at substantially 120° therefrom and is located intermediate the ends of the plug 10.

For purposes of illustration only the contacting surfaces of the projections are shown as disposed at an angle with respect to the axis of the plug 10 so that a plane passing through the surface of projection 12, for example, will coincide with the surface on the projection 13. The surfaces of all the projections are shown as similarly tapered so that when the plug is inserted in the socket 1 the surfaces of the five projections will contact the inner surface 3 of the socket and thereby provide a snug fit as between the two members. The extent of the contacting surface on each projection, however, is not important except for the wearing properties thereof. The surface of each could be rounded so that only a point contact would be made. The real consideration in all forms of the invention is the five point contact between the two members. Thus, the wall of either or both members could be axially curved as long as the five point contact between them is made. The term "tapered" as used herein, and in the claims is intended to include any surface or wall having a larger diameter at one end than the other regardless of the intermediate configuration, such as axially curved.

It will be obvious that the invention also embraces the converse of the foregoing structure wherein the inner surface of the socket is tubular but is provided with projections thereon so that a tapered plug inserted therein will contact the five inner projections to again provide a snug fit as between the two members.

In all forms of the invention the machining operation currently necessary in the tapered socket and plug assemblies has been eliminated or reduced, thus reducing the manufacturing cost considerably and yet producing a device at least as satisfactory as those heretofore made.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A device of the class described comprising a socket member, a plug member adapted to be removably received thereby, one of said members having a rigid, non-deformable tapered wall adapted to cooperate with the other member, two pairs of axially spaced rigid projections on the wall of the other of said members, and another rigid projection intermediate the ends of said other member and intermediate said two pairs of projections, said projections having surfaces forming a taper corresponding to the tapered wall of said one member, said surfaces of all of said projections engaging the surface of the tapered wall of said one member to provide a snug fit when the members are in assembled relation.

2. A device of the class described comprising a socket member, a plug member adapted to be removably received thereby, one of said members having a rigid, non-deformable tapered wall adapted to cooperate with the other member, two pairs of axially spaced rigid projections on the wall of the other of said members and spaced apart circumferentially substantially 120 degrees, and another rigid projection intermediate the ends of said other member and circumferentially spaced from said pairs of projections substantially 120 degrees, said projections having surfaces forming a taper corresponding to the tapered wall of said one member, said surfaces of all of said projections engaging the surface of the tapered wall of said one member to provide a snug fit when the members are in assembled relation.

References Cited in the file of this patent

UNITED STATES PATENTS

| | | |
|---|---|---|
| 149,014 | Warner | Mar. 24, 1874 |
| 1,471,520 | McCloy | Oct. 23, 1923 |
| 2,264,035 | Birkhofer | Nov. 25, 1941 |
| 2,569,275 | Baker | Sept. 25, 1951 |
| 2,724,048 | Sherbinin | Nov. 15, 1955 |